United States Patent [19]

Haverdink

[11] 3,967,684
[45] July 6, 1976

[54] WINGFOLD POSITIONING DEVICE

[75] Inventor: Virgil Dean Haverdink, Ankeny, Iowa

[73] Assignee: Deere & Company, Moline, Ill.

[22] Filed: Aug. 1, 1974

[21] Appl. No.: 493,539

[52] U.S. Cl.............................. 172/311; 172/457; 172/481; 172/674
[51] Int. Cl.².................. A01B 63/14; A01B 49/00
[58] Field of Search ........... 172/126, 130, 131, 311, 172/431, 456, 457, 459, 460, 462, 481, 482, 494, 500, 662, 674; 239/166, 167, 168; 280/411 R; 56/228; 111/33; 37/105

[56] References Cited
UNITED STATES PATENTS

| | | | |
|---|---|---|---|
| 2,972,385 | 2/1961 | Walberg.......................... | 172/456 X |
| 3,250,333 | 5/1966 | Day..................................... | 172/126 |
| 3,321,028 | 5/1967 | Groenke ............................. | 172/311 |
| 3,670,823 | 6/1972 | Mathews et al.................. | 172/130 X |
| 3,766,987 | 10/1973 | Orthman............................. | 172/126 |
| 3,799,272 | 3/1974 | Watson............................... | 172/126 |
| 3,828,860 | 8/1974 | Poland............................... | 172/311 |
| 3,844,358 | 10/1974 | Shuler et al......................... | 172/311 |
| 3,866,688 | 2/1975 | Hansen............................... | 172/311 |

FOREIGN PATENTS OR APPLICATIONS 1,009,611   3/1952   France................................ 239/168

Primary Examiner—Paul E. Shapiro
Assistant Examiner—Richard T. Stouffer

[57] ABSTRACT

A foldable multiple sectioned farm implement having a center section, side sections that fold inwardly and upwardly so that the center of gravity of the folded sections is inboard of the respective folding pivotal axis, and biasing structure which acts to unfold the side sections by forcing the respective center of gravity of each folded section outwardly of its respective pivotal axis. The biasing structure is mounted on a brace member secured to the center section to engage the side sections when folded inwardly and upwardly. Included with the biasing structure are support mounts positioned on each end of the brace member, each of which slidably supports a spring biased rod. Each rod contacts a side section to bias it outwardly by the spring bias acting thereon.

1 Claim, 6 Drawing Figures

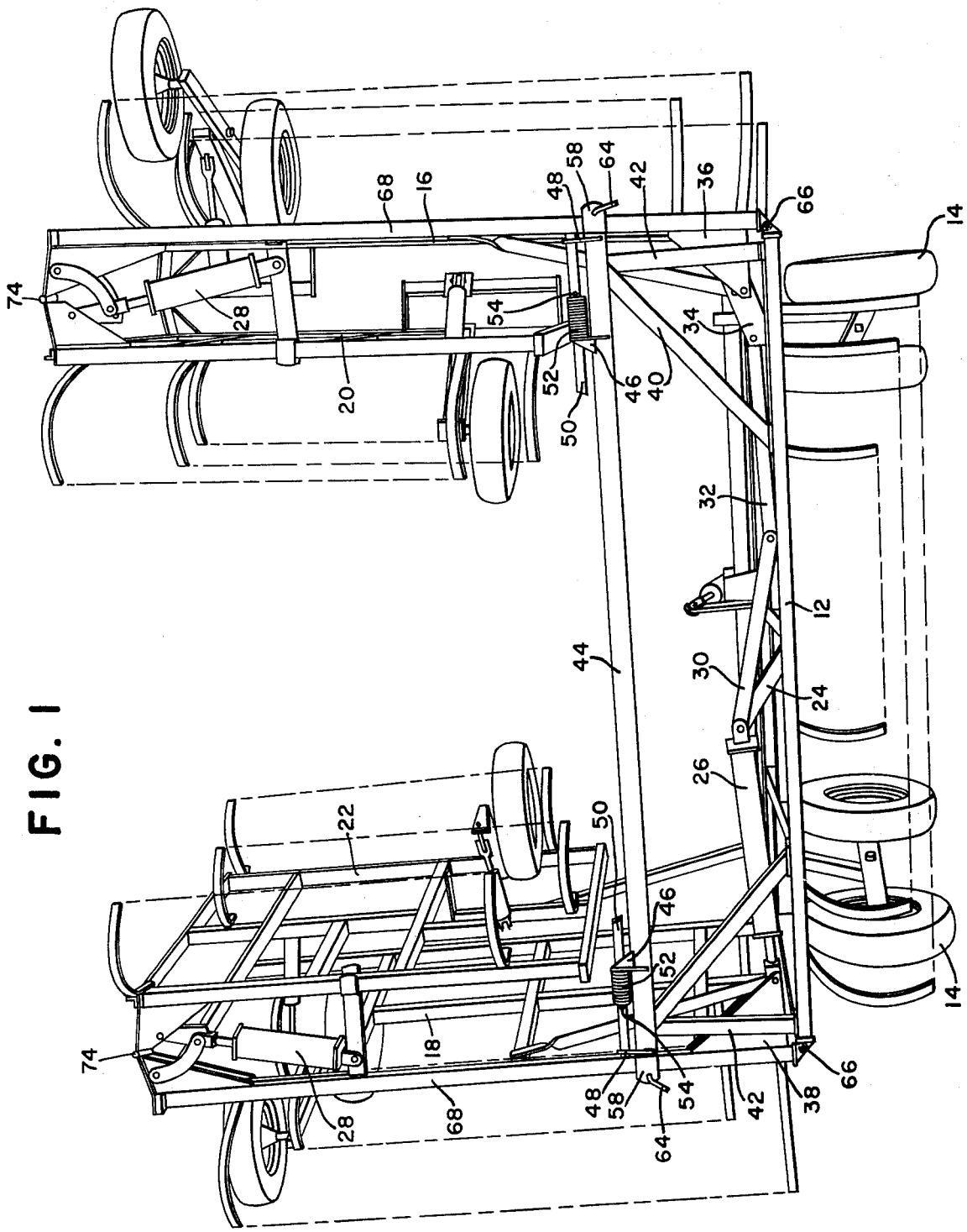

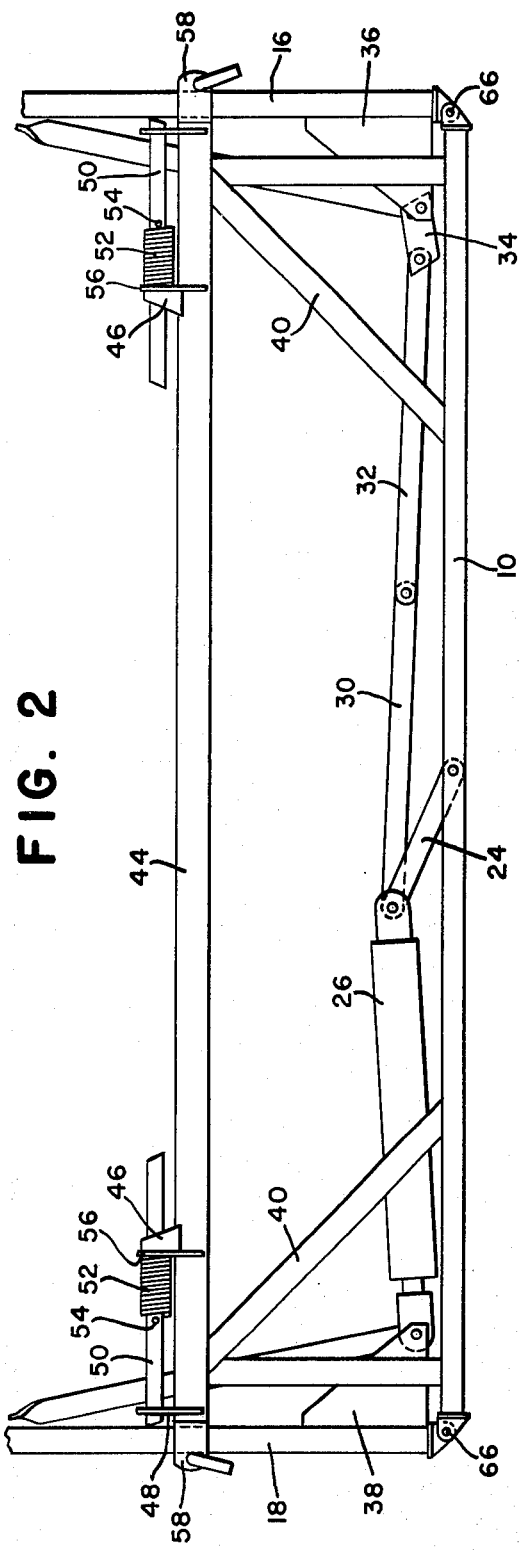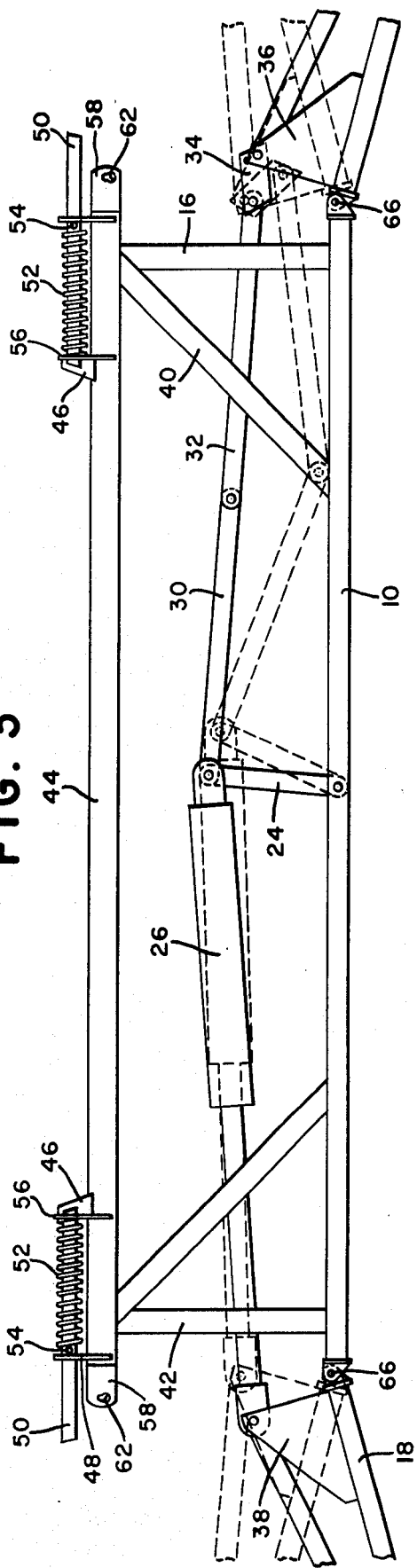

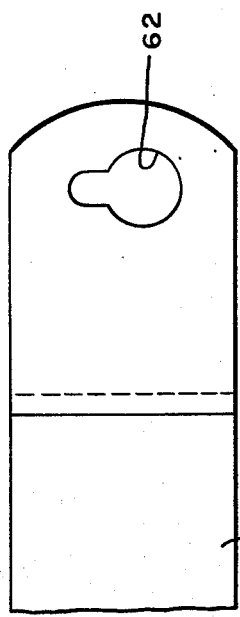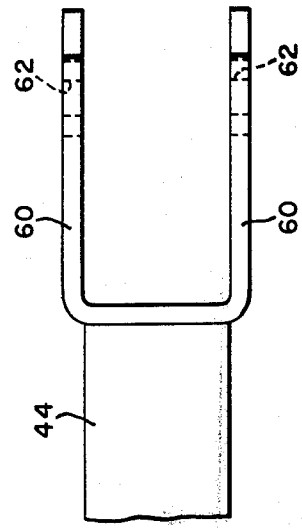

WINGFOLD POSITIONING DEVICE

BACKGROUND OF THE INVENTION

The invention relates generally to farm equipment of the ground-working or cultivating type having a plurality of sections connected together to form a wide transverse structure and more particularly to the type having a main central section and adjacent side sections spaced in a side-by-side relationship and pivotally connected to the center section to be folded thereabout.

Multiple sectioned farm implements of the type having sections folded by hydraulic cylinders are known in the art. It is also known to use stop means to limit the arc through which the sections rotate as folded and latch means to secure the forward sections when they are transported or stored.

SUMMARY OF THE INVENTION

Multiple sectioned farm implement wing sections which, when folded have their center of gravity inwardly of their respective pivotal axis adjacent the fixed center section, require a means to force the center of gravity outwardly of the pivotal axis when they are to be unfolded.

According to he present invention, simple and inexpensively manufactured, operated and maintained single- or double-acting hydraulic cylinders can be used to fold and unfold multiple wing sections of this type. The present embodiment of the invention utilizes a single-acting hydraulic cylinder to fold the multiple wing sections, a stop and latch means to secure the folded section's center of gravity in a position that permits the use of force-transmitting biasing means to move said section's center of gravity outwardly of the folding pivotal axis.

BRIEF DESCRIPTION OF THE DRAWINGS

FIG. 1 is a rear elevational view of an agricultural machine constructed according to the invention and showing the wing members in a folded position. FIG. 2 is an enlarged elevational view of the folded positioning means including the lifting mechanism, stop means, latch mechanism and biasing means.

FIG. 3 is an enlarged elevational view of the positioning means when the implement is in operation.

FIG. 4 is an enlarged top view of the U-shaped stop means at each end of the brace.

FIG. 5 is an enlarged side view of the U-shaped stop means at each end of the brace.

DESCRIPTION OF THE PREFERRED EMBODIMENT

Figure 6:
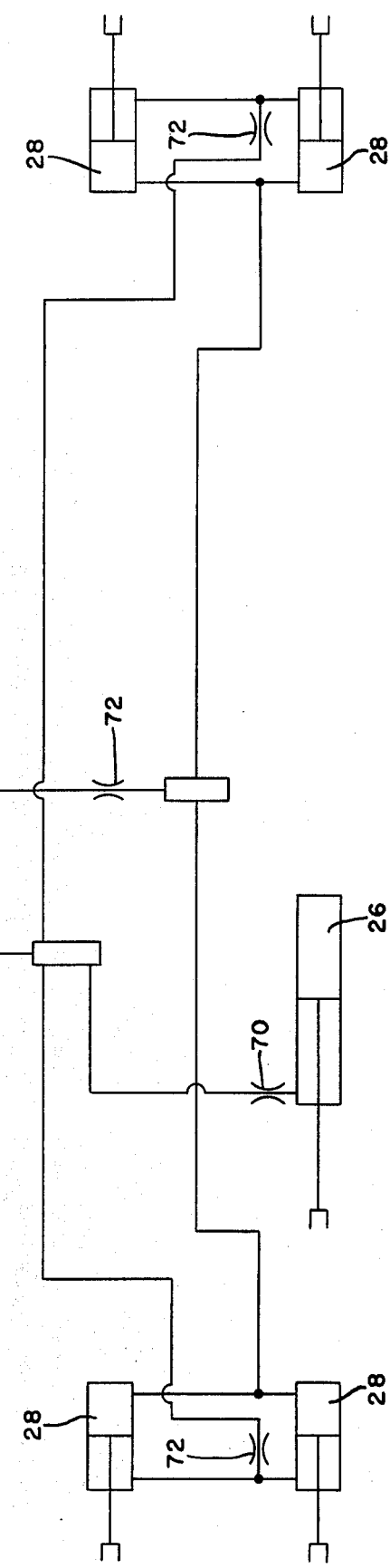
FIG. 6 is a schematic view of the hydraulic system employed in the present invention.

The invention is illustrated in the preferred embodiment in FIG. 1. A mobile frame or center section 12 is comprised of front and rear rigidly united frame sections being of box-like construction by the use of rigidly interconnected frame parts and supported by a pair of transversely spaced apart ground wheels 14.

Adjacent the center section 12 are inner wing sections 16 and 18, pivotally connected at their inner extremities to the opposite outer extremities of the center section, and outer wing sections 20 and 22 pivotally connected at their inner wing extremities to the outer extremities of their respective adjacent inner wing sections 16 and 18. Pivotally attached to the rear frame member of the center section is a center link 24. The free portion of the center link is pivotally attached to the base end of a hydraulic lift cylinder 26 which may be single-acting or double-acting. That lift cylinder 26 is plumbed hydraulically in parallel (see FIG. 6) with the fold cylinders 28 to facilitate the folding of the outer wing sections 20 and 22 prior to the folding of the inner wing sections 16 and 18 and permit unfolding of the inner wing sections prior to the unfolding of the outer wing sections. One end of a first rigid link 30 is pivotally attached to the lift cylinder base end and the other end of said link is pivotally engaged to a second rigid link 32. The opposite end of the second rigid link 32 is pivotally attached to a rectangularly shaped third link 34 which is in turn pivotally secured to an inner wing bracket 36 which is secured to the inner wing 16. A single inner wing inner bracket 38 is also securely mounted on the inner portion of the inner wing 18. Pivotally attached to that bracket 38 is the rod end of the lift cylinder 26.

Securely mounted at opposite portions of the center section rear frame member are respective sets of upright brace mounts 40 and 42 supporting a transverse brace 44 that is positioned parallel to the center section. Structurally identical sets of rod mounts 46 and 48 are secured to opposite end portions of the transverse brace 44 and horizontally slidable rods 50 coaxial with and internal to coiled springs 52 rest therein. The coiled springs 52 are positioned between the innermost mount 48 and stops 54 securely fastened to the slidable rod.

Each end of the transverse brace 44 has a U-shaped stop 58 (see FIGS. 4 and 5) with an open portion between jaws 60. Holes 62 are in each jaw 60 wherein pins 64 are inserted to secure and stabilize the raised inner wing sections 16 and 18 to the brace 44.

The invention operates as follows: double-acting hydraulic fold cylinders 28 are pivotally secured between the respective sets of inner wing sections 16 and 18 and outer wing sections 20 and 22, to rotatably pivot the outer wing sections 20 and 22 upwardly and inwardly, folding them over and parallel to their respective inner wing sections 16 and 18. After the outer wings are folded, the operator manually moves a single hydraulic system lever which causes the hydraulic lift cylinder 26 to retract. As the hydraulic fluid fills the lift cylinder, the rod is retracted and the inner wings are rotated upwardly and inwardly about their pivotal axis 66. As the lift cylinder rod is retracted, it acts through the bracket 38 to rotate the inner wing 18 inwardly and upwardly. The inner wing 16 is rotated upwardly as the rod retracts acting through the rigid under-tension linkages 30, 32 and 34. Typically the wing sections will have mounted on them depending earth-working tools. As the inner wings rotate through the last few degrees of the 90° arc, the center of gravity of the folded wings and depending tools moves inwardly of the pivotal axis 66. As the rotation is completed, a cross member 68 of each inner wing depresses a slidable rod 50 and thereby compresses the coiled spring 52. As the cross member comes to rest in the U-shaped portion 58 of the transverse brace 44, a pin 64 is inserted into the opening 62 to secure the cross member in place during transport and storage. The operator can then manually move the hydraulic system lever to stop the pumping action of the hydraulic system while the inner wings are raised for transportation and storage and secured to the transverse brace 44.

To lower the wing sections for operation requires a reversed procedure. The operator manually moves a hydraulic system lever to cause the lift cylinder rod to retract completely so that the pins 64 can be removed. After the pins have been removed, the hydraulic system control lever is moved to a float position and the compressed spring 52 on the bias means forces the slidable rod 50 outwardly thereby moving the inner wings outwardly and forcing the center of gravity of the raised inner wings 16 and 18 outwardly of the pivotal axis 66. As the wings'to center of gravity passes outwardly of the pivotal axis 66, a restrictor valve 70 in the hydraulic lift plumbing system begins to regulate the rate at which hydraulic fluid can escape from the lift cylinder and therefore also the rate of fall of the folded outer and inner wing sections. As the inner wing contacts the ground and the lift cylinder rod is fully extended, the operator would move the hydraulic fluid control lever to a pump position to cause the hydraulic fluid under pressure to be directed to the folding cylinders and the folding cylinder rods to then extend and unfold the outer wing sections about the pivotal axis 74. A restrictor valve 72 in the hydraulic fold plumbing system regulates the rate at which hydraulic fluid can escape from the fold cylinders and therefore the rate of descent of the outer wing sections. Because the lowering of the elevated wing sections is accomplished by the spring-loaded rod, gravity and rate-restricting valves in the hydraulic system, the lift cylinder 26 need only be a single-acting cylinder utilized during lifting operations and the linkage 30, 32, and 34 need be rigid only under tension. Referring to FIG. 3 and the position of the sections as illustrated by the dotted lines, it can be seen that during operation of the cultivator, the linkage 30, 32, and 34 will be flexible under compression permitting the wing sections to float as necessary about the pivotal connections 66. This flexible connection is accomplished by attaching the hydraulic cylinder 26 base end to the pivotally secured link 24, and providing links 30, 32, and 34 with pivotal connections which permit pivotal action when the links are pushed towards one another.

I claim:

1. In a foldable multiple sectioned farm implement having a center section having ground wheels; outer sections in substantial transverse horizontal alignment with said center section; fore-and-aft pivotal connections joining the center and outer sections; the improvement residing in outer section positioning means comprising: a transverse brace member positioned above, substantially abridging the transverse expanse of, and secured to the center section; an outwardly opening U-shaped stop means secured to each end of the brace member above each pivot formed by said pivotal connections; at least one single-acting hydraulic cylinder connected to and for moving the outer sections by its power stroke upwardly to an inboard position whereat the outer sections engage their respective stop means and in which position the outer sections'to centers of gravity are located inboard of the pivots; latch means operatively connected with the center section to disconnectibly engage the raised outer sections and secure them in their inboard positions; and biasing means carried by said brace member for abutting said outer sections to exert outward forces against the outer sections when their respective centers of gravity shift inboard of the respective pivots, said biasing means including two pairs of transversely spaced apart support mounts, each of said pairs being secured to a different end portion of the brace member from the other of said pairs, a pair of rods, each of said rods being slidably supported in a different pair of mounts from the other of said rods, said rods being slidably supported in said mounts for transverse movement, each of said rods having a stop secured thereto, a pair of helical springs, each of said helical springs coaxially surrounding one of said rods and extending between one of said support mounts and said stop of said one of said rods.

* * * * *